United States Patent [19]
McSheffrey et al.

[11] Patent Number: 5,834,651
[45] Date of Patent: Nov. 10, 1998

[54] HEAT TREATED RAPID RESPONSE PRESSURE GAUGE SPRING

[75] Inventors: John J. McSheffrey, Hingham; Joseph T. Marone, Sandwich; Mark W. Moeller, Kingston, all of Mass.

[73] Assignee: MIJA Industries, Inc., Plymouth, Mass.

[21] Appl. No.: 638,343

[22] Filed: Apr. 26, 1996

Related U.S. Application Data

[62] Division of Ser. No. 403,672, Mar. 14, 1995.

[51] Int. Cl.$^6$ .............................. G01L 7/04; B21B 17/12
[52] U.S. Cl. .......................................... 73/743; 72/370.23
[58] Field of Search ........................... 73/741, 742, 743; 72/367.1, 368, 369, 370.23

[56] References Cited

U.S. PATENT DOCUMENTS

| | | |
|---|---|---|
| 537,588 | 4/1895 | Steinle . |
| 1,521,343 | 12/1924 | Townsend . |
| 1,714,988 | 5/1929 | Schlaich . |
| 1,798,645 | 3/1931 | Withers . |
| 2,063,166 | 12/1936 | Jansse ........................................ 159/1 |
| 2,495,314 | 1/1950 | Caldwell .................................. 73/418 |
| 2,522,780 | 9/1950 | Dickson ................................... 73/418 |
| 3,232,116 | 2/1966 | Perkins .................................... 73/418 |
| 3,382,720 | 5/1968 | Young ...................................... 73/418 |
| 3,805,619 | 4/1974 | Wunderlich . |
| 3,840,366 | 10/1974 | Hirayama et al. ........................ 75/124 |
| 3,986,400 | 10/1976 | Schmaus .................................. 73/741 |
| 4,015,478 | 4/1977 | Schmaus .................................. 73/741 |
| 4,191,056 | 3/1980 | Holden ..................................... 73/743 |
| 4,424,083 | 1/1984 | Polizzoti et al. ....................... 148/286 |
| 4,484,698 | 11/1984 | Starr ...................................... 73/736 X |
| 4,615,219 | 10/1986 | Ache ........................................ 73/741 |
| 4,634,429 | 1/1987 | Schoettley .............................. 604/115 |
| 4,646,406 | 3/1987 | Weiss et al. ........................... 73/743 X |
| 4,667,517 | 5/1987 | Holden .................................... 73/743 |

OTHER PUBLICATIONS

*Metals Handbook, Ninth Edition*, vol. 3 Properties and Selection: Stainless Steels, Tool Materials and Special–Purposes Metals, pp. 47–48.

Lindeberg, M.R., "Engineer–in–Training Reference Manual", 8th edition, Professional Publications, Inc. 1992 pp. 37–7 and 37–8.

*Primary Examiner*—Richard Chilcot
*Assistant Examiner*—Paul D. Amrozowicz
*Attorney, Agent, or Firm*—Fish & Richardson P.C.

[57] ABSTRACT

In general, the invention features a spring assembly for a gauge with a hollow metal tube that changes in volume in response to differential pressures applied across the walls. The tube has a neck connected to a fitting of the gauge, a body connected at one end to the neck with its other end sealed, and at least a portion of the walls of the body being flattened and cold worked to a reduced thickness to thereby increase their yield point to a spring temper. The body is coiled into a spiral or helix. The coiled tube is heat treated to increase its elasticity. The interior of the neck is in pressure communication with the fitting, and the interior of the body is in pressure communication through its unsealed end with the interior of the neck, whereby a change in the pressure applied to the fitting is communicated along the interior of the body changing the differential pressure across the walls of the body to cause a corresponding change in the volume.

12 Claims, 3 Drawing Sheets

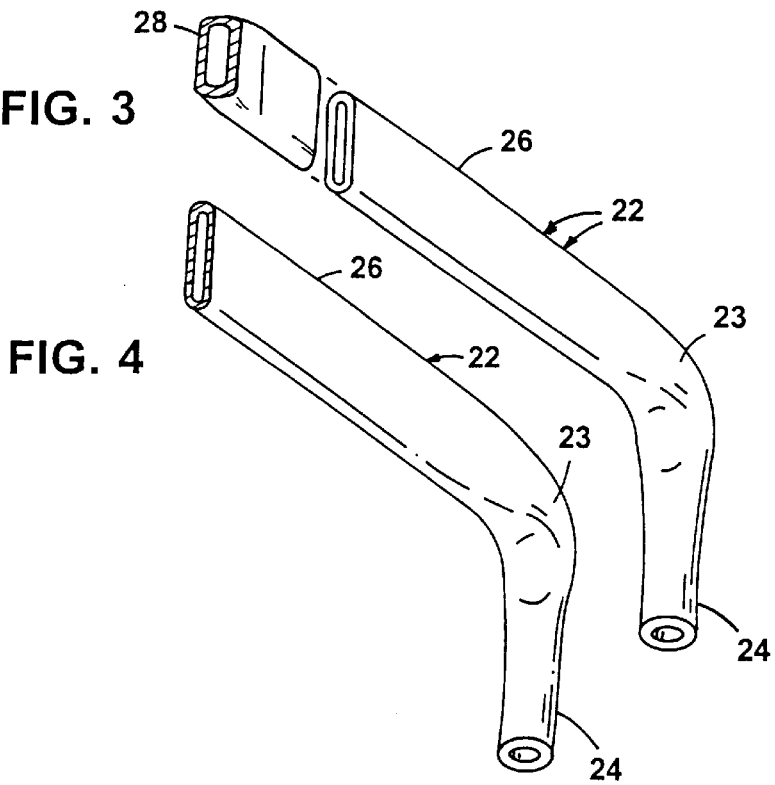
FIG. 3
FIG. 4
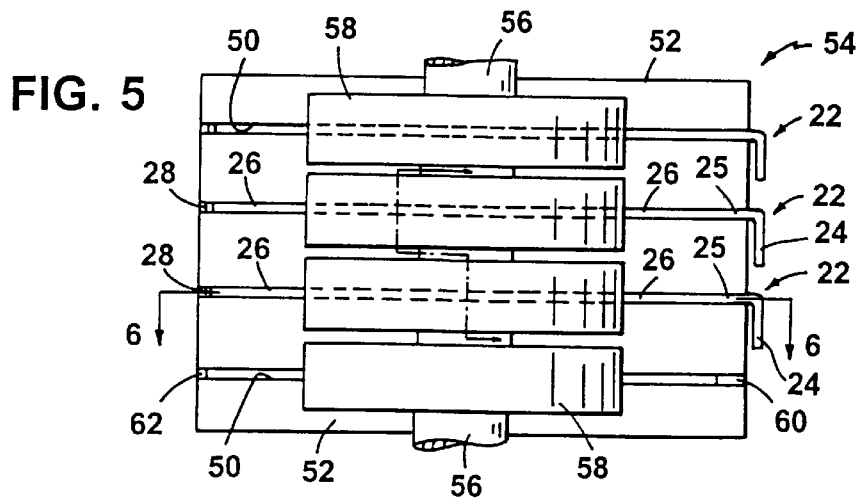
FIG. 5
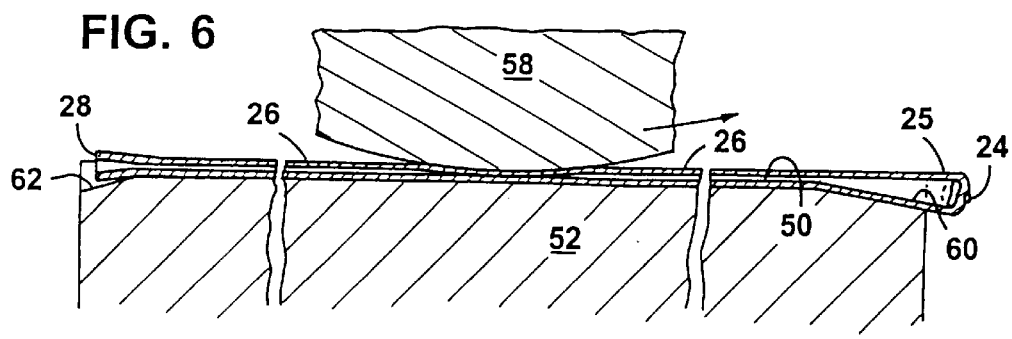
FIG. 6

HEAT TREATED RAPID RESPONSE PRESSURE GAUGE SPRING

This is a divisional of copending application Ser. No. 08/403,672, filed Mar. 14, 1995.

BACKGROUND OF THE INVENTION

This invention relates to pressure responsive spring gauges for measuring pressure, temperature or the like.

It is known, e.g. from Holden U.S. Pat. No. 4,191,056, the disclosure of which is incorporated herein by reference, to form a spring element of the Bourdon tube variety by compressing or cold working the conventionally flattened walls of a metal tube to a reduced thickness to increase its yield strength and provide it with a spring temper. Such a gauge has been fabricated from a relatively inert metal, and particularly from stainless steel, to provide an inexpensive solution to a broad range of difficult applications wherein previously the pressurized fluid had a tendency to react with the thin-walled metal causing the tube to develop leaks.

It is also known, e.g. from Holden U.S. Pat. No. 4,667,517, the disclosure of which is also incorporated herein by reference, that the response of such a gauge is greatly enhanced by compressing or cold working only the peripheral portions of the flattened tube walls relative to the center to provide an axially extending channel for rapid transmission of pressure change. In addition to improving reaction time, the channel also provides an effective means for controlling the arc or range of swing of the gauge to accommodate different applications.

SUMMARY OF THE INVENTION

In a first aspect, the invention features a spring assembly for a gauge comprising a hollow metal tube adapted to change in volume in response to differential pressures applied across the walls, the tube having a neck portion adapted to be connected to a fitting of the gauge, a body portion connected at one end to the neck portion, at least a portion of the walls of the body portion being flattened and cold worked to a reduced thickness to thereby increase their yield point to a spring temper and the body portion being coiled into a spiral, or helix, and the coiled tube being heat treated to thereby increase the elasticity thereof, and the other end of said body portion being sealed, the interior of the neck portion adapted to be in pressure communication with the fitting, and the interior of the body portion adapted to be in pressure communication through its unsealed end with the interior of the neck portion, whereby a change in the pressure applied to the fitting is communicated along the interior of the body portion changing the differential pressure across the walls of the body portion and causing a corresponding change in the volume.

In another aspect, the tube is thin-walled stainless steel; the entire body portion of the tube is cold worked a substantially uniform amount; the body portion is formed into a spiral, or helix, that is flattened transversely and coiled longitudinally.

In another aspect, the cold worked walls of the body portion are reduced to a substantially uniform thickness transversely of the tube; the walls of the tube are about 0.002 to 0.0085 inch thick; the walls of the tube are cold worked to a reduced thickness of 60 to 80 percent of their original thickness.

In another aspect, the body portion has peripheral portions and central portions, the peripheral portions are compressed to a reduced thickness by cold working and the central portions are compressed relatively less than the peripheral portions and are not cold worked to thereby form an axially extending channel to thereby enhance pressure transmission along said tube; the walls of the tube are about 0.002 to 0.003 inch thick; the peripheral portions of the walls of the body portion are cold worked to a reduced thickness of 70 to 95 percent of their original thickness; the central portions of the walls of the body portion extend from the peripheral portions in the same direction, one of the central portions having a convex wall portion and the other having a concave wall portion; the convex wall portion is oriented radially outward to provide a long swing in response to pressure changes; the convex wall portion is oriented radially inward to provide a short swing in response to pressure changes.

In another aspect of the invention, the tube is heat treated at a temperature in the range of 500° F. to 800° F., and preferably at a temperature of about 675° F. to 725° F., for approximately 2 hours; the sealed end of the body portion is sealed by a weld bead and a pointer is connected to the nose portion by the weld bead.

These and other features and advantages of the invention will be apparent from the following description of a presently preferred embodiment, and from the claims.

BRIEF DESCRIPTION OF THE DRAWINGS

FIG. 3 is an enlarged perspective view, partially broken away, of one embodiment of a spring element for the gauge of FIG. 1, shown in an intermediate stage of fabrication prior to cold working;

FIG. 4 is an enlarged perspective view, partially broken away, of the spring element of FIG. 3, shown in an intermediate stage of fabrication after it has been cold worked; and FIG. 5 shows a portion of a rolling machine used to cold work the spring element of FIGS. 3 and 4; and FIG. 6 is a side section view taken at the line 6—6 of FIG. 5.

DESCRIPTION OF THE PREFERRED EMBODIMENTS

Figure 1:
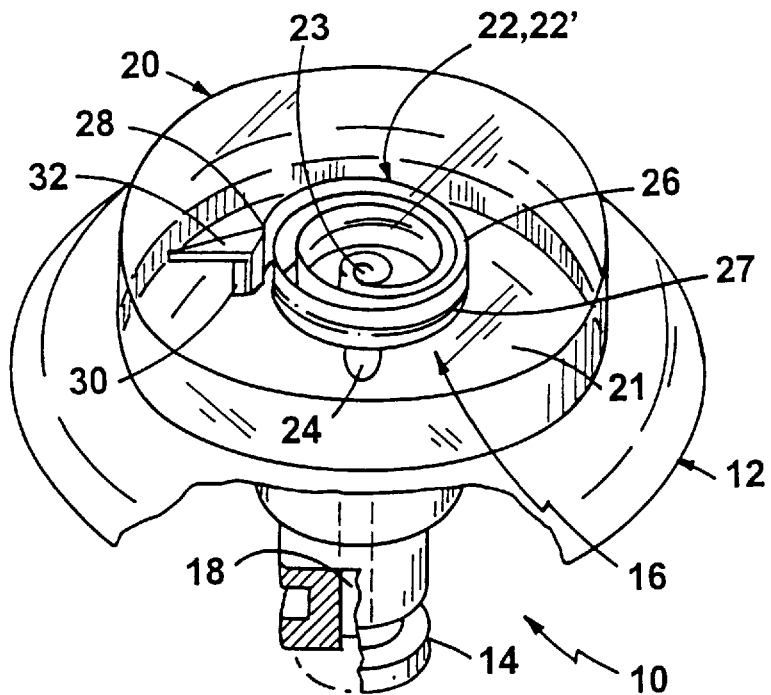
FIG. 1 is a perspective view, partially broken away, of a pressure gauge having a spring element according to the present invention.

FIG. 1 shows a pressure gauge 10 having a stainless steel base 12, a stainless steel pressure fitting 14 with an axially extending bore 18 therethrough mounted in a central hole in the base, a spring assembly 16 connected to the bore in the fitting, and a clear plastic lens 20 secured around its periphery to the base and projecting outwardly therefrom. The face of the base is provided with indicia 21.

Figure 2:
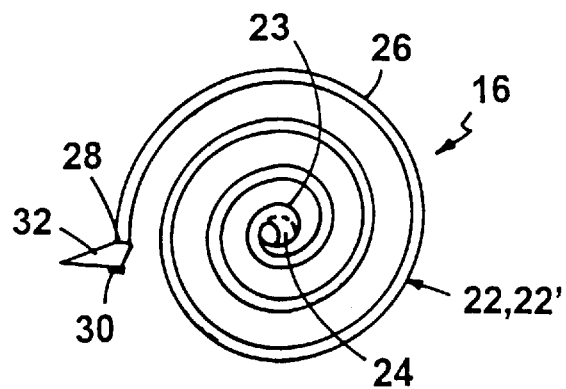
FIG. 2 is a plan view of a spring element of the gauge of FIG. 1.

Referring to FIGS. 1 and 2, spring assembly 16 comprises a thin-walled stainless steel tube 22 having a neck portion 24 adapted to be sealingly connected in bore 18 of fitting 14, a transition portion 23, a transversely flattened body portion 26 longitudinally coiled in a spiral or helix, and a nose portion 28 sealed with a weld bead 30. Pointer 32 is attached to nose 28 by weld bead 30.

FIGS. 3 and 4 show the spring assembly of FIG. 2 in intermediate stages of construction. First, as shown in FIG. 3, tube 22 is bent at a right angle at transition portion 23 to form a neck portion 24, and is flattened in the conventional way to form a body portion 26 and a nose portion 28. As shown in FIG. 4, in one embodiment described in Holden U.S. Pat. No. 4,191,056, tube 22 is cold worked uniformly across its body portion 26 to a spring temper. The walls of body portion 26 are reduced in thickness and their yield point is increased.

Referring now to FIGS. 5 and 6, the tubes are cold worked in a rolling machine 54. Grooves 50 are ground in a hardened flat stock 52. Tubes 22 are placed in the grooves 50, and a shaft 56 having bearings 58 mounted thereon is rolled over the surface of the stock 52 pressing the body portion 26 of the tubes into the grooves causing the walls of the tube to be squeezed to the reduced thickness of body portion 26, as shown in FIG. 4. Recesses 60 and 62, provided in each groove 50, are adapted to respectively receive transition portion 25 and nose 28 of each tube 22 to prevent them from being squeezed by roller 58. Advantageously, it has been found that while the walls of the body portion 26 are squeezed together as the rollers pass over, they spring back open slightly so that the body portion is not pinched together, but remains hollow so that pressure may be communicated therethrough.

Figure 7:
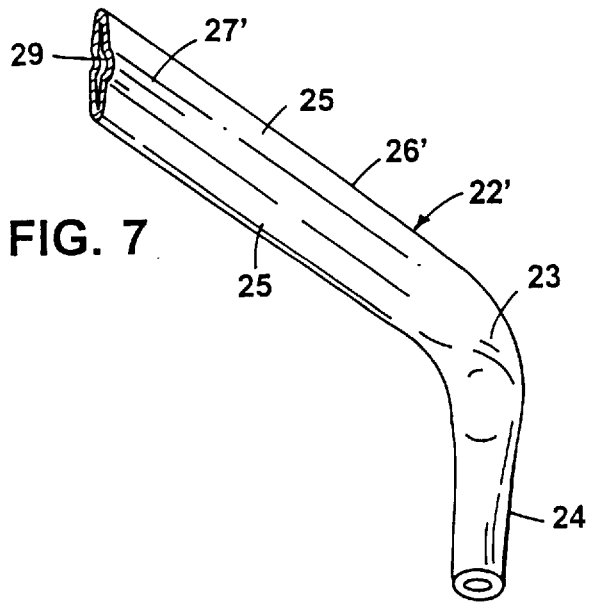
FIG. 7 is an enlarged perspective view, partially broken away, of another embodiment of a spring element for the gauge of FIG. 1, shown in an intermediate stage of fabrication after it has been cold worked.

Alternatively, as shown in FIG. 7, in one embodiment shown in Holden U.S. Pat. No. 4,667,517, after the tube is bent at a right angle at the transition portion to form a neck portion and then flattened to form a body portion and a nose portion, tube 22' is cold worked along the peripheral portions 25 of body portion 26', the walls of the tube being reduced in thickness along their peripheral portions to increase their yield strength and provide a spring temper, while the portions of the tube walls along central axis 27 of the body portion, are not cold worked or are cold worked to a relatively lesser degree, to form axially extending channel 29 that provides a passage for pressure transmission along the tube.

Figure 8:
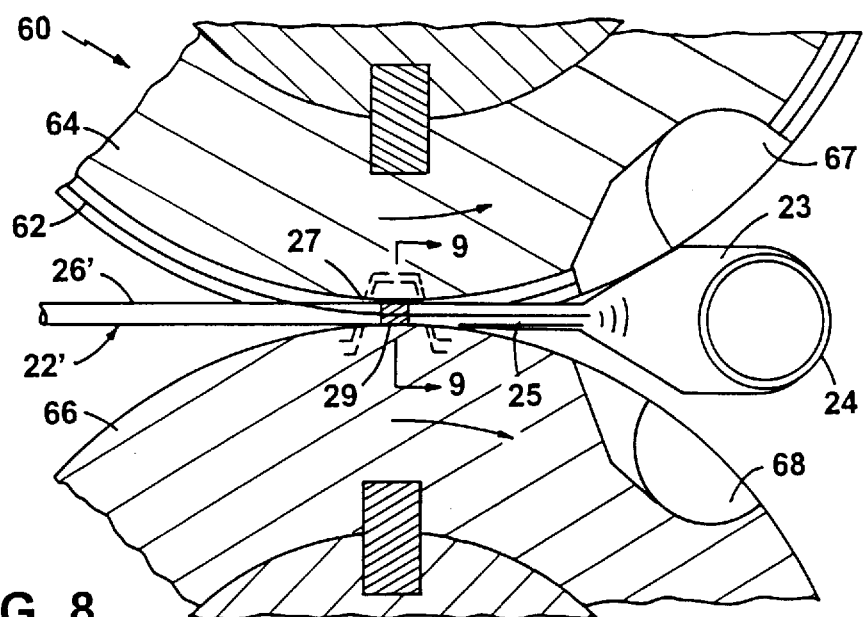
FIG. 8 is a side section view of a rolling machine for cold working the spring element of FIG. 7.
Figure 9:
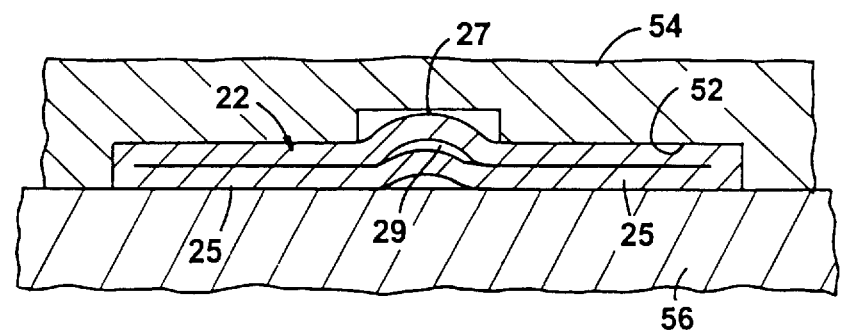
FIG. 9 is a side section view taken at the line 9—9 of FIG. 8.

Referring to FIGS. 8 and 9, the tube of FIG. 3 is cold worked as shown in FIG. 7 by compressing it between rollers 64, 66 in machine 60. Groove 62 in roller 64, is adapted to receive body portion 26' of the tube and is shaped to press peripheral portions 25 of the body portion against opposed roller 66 and thereby squeeze it to a reduced wall thickness, while the portion of the tube along its central axis 27 is not compressed by the rollers and forms axially extending channel 29. Opposed recesses 67, 68 are adapted to receive the neck and transition portion of the tube to prevent them from being squeezed between the rollers and to pull the tube through the rollers.

Referring again now to FIG. 2, a flattened cold worked body portion (22 (FIG. 3) or 22' (FIG. 7)) is wound into a spiral or helix. The tube, now in the shape of a coil spring, is heat treated, by conventional means, at a temperature in the range of about 500° F. to 800° F. for about 1 to 3 hours, and preferably at a temperature of approximately 700° F. (±25° F.) for about 2 hours.

A weld bead is placed in the nose 28 to seal the end of the tube, and at the same time to fasten a pointer 32 to the nose.

Heat treatment improves the elasticity of the tube thus increasing the maximum stress that can be applied to the tube before it becomes permanently deformed.

In particular, the performance of prior art spiral Bourdon tubes in overpressure testing was compared to the performance of spiral Bourdon tubes heat treated according to the invention. The overpressure testing was conducted by attaching a high pressure calibrated gauge (accuracy of 0.25% full scale) to a spiral Bourdon tube filled with Nitrogen gas. Pressure was gradually increased by 25 psi until a permanent set was observed, indicated by failure of the Bourdon tube to return to zero upon release of pressure.

The comparative overpressure testing showed that the overpressure charge, reflecting the elasticity of the material, for a spiral Bourdon tube hat, after being cold worked, was heat treated according to the invention, was at least 27% higher than the overpressure charge for a spiral Bourdon tube formed from the same stock of material and cold worked in the same manner, but not heat treated.

In operation, fitting 14 is connected to a source of pressure (not shown). The pressure is communicated through bore 18 and neck 24 of tube to body portion. The pressure causes the body portion to increase in volume and the spiral or helix to unwind, moving the pointer 32 through an arc measured by indicia 21. Subsequent increases in pressure cause the body portion to unwind further in measured amounts. Similarly, subsequent decreases in pressure cause corresponding decreases in the volume of tube and the body portion will wind up a measured amount.

In the embodiment of FIG. 7, where the tube 22' is cold worked only along the edge regions, and not in the center, a channel 29 provides for rapid transmission of pressure along the axis of the tube, resulting in greatly improved reaction time. It is further found that the orientation of channel 29 can be varied to provide a means for adjusting the arc or swing of the gauge to meet the requirements of different applications. In particular, by orienting the convex face of the channel radially outwardly, the swing of the gauge in response to a given pressure change will be over a relatively longer arc, whereas orienting the convex face of the channel in a radially inward direction provides a relatively shorter swing.

Other embodiments are within the scope of the following claims. For example, in a spring element of FIG. 7 channel 29 provides a stiffening effect, so relatively less cold working is required, e.g. a compared to a spring element of FIG. 4. Accordingly, it has been found that, for thin-walled stainless steel tubes, cold working the peripheral portions of the tube to a 5 to 30 percent reduction in wall thickness provides an adequate spring temper and increase in yield strength. The specific reduction needed for each particular application (and the corresponding geometry of the grooves in the flat stock or of the groove in roller 64) is readily determined using known cold working principles. For example, more ductile metals, e.g., stainless steel having a lower carbon content, would require a correspondingly greater amount of cold working. Also, tubes having thicker walls will require correspondingly less cold working.

Also, the nose portion 28 may be sealed with silver solder, and/or the pointer 32 is attached to nose 28 by solder.

What is claimed is:

1. A method of manufacturing coiled tubing for use in a Bourdon-type coiled tube gauge assembly, said method comprising:

providing a cylindrical, hollow tube having a longitudinal axis;

bending the hollow tube substantially at a right angle with respect to the longitudinal axis at a transition portion of the tube, the transition portion separating a neck portion from a body portion;

flattening the body portion of the tube to reduce the thickness of the walls of the tube to form a pair of broad walls separated by peripheral walls;

winding the body portion of the tube into a spiral to form a coil;

heat treating the tube coil to increase a maximum stress that can be applied to the tube before it plastically deforms; and sealing the nose portion of the tube.

2. The method of claim 1 wherein said flattening step includes uniformly compressing the body portion of the tube to provide said body portion with a spring temper.

3. The method of claim 1 wherein said flattening step includes compressing only the peripheral walls of the body portion of the tube to increase the yield strength of the side walls and to form a channel extending along the longitudinal axis of the tube.

4. The method of claim 1 wherein said flattening step includes:

positioning the body portion of the tube within a hardened fixture member having a groove with a width less than a diameter of the body portion of the tube; and moving a rolling member over the tube to force said body portion within said groove, thereby reducing the thickness of the walls of the tube.

5. The method of claim 4 wherein said flattening step further includes forming recesses within the groove of the hardened member to receive the transition and nose portions of the tube.

6. The method of claim 1 wherein flattening the body portion of the tube provides the body portion with walls having a thickness about 0.002 inch to 0.0085 inch.

7. The method of claim 1 wherein flattening the body portion of the tube reduces the thickness of the walls of the body portion to about 60 to 80 percent of the original thickness.

8. The method of claim 1 wherein winding said body portion includes forming said tube so that the spiral is flattened transversely and coiled longitudinally.

9. The method of claim 1 wherein said heat treating step comprises treating the tube at a temperature in the range of 500° F. to 800° F. for approximately 1 to 3 hours.

10. The method of claim 9 wherein said heat treating step comprises treating the tube at a temperature of about 675° F. to 725° F. for approximately 2 hours.

11. The method of claim 1 wherein said sealing step comprises placing a weld bead at the end of the nose portion of the tube.

12. The method of claim 1 wherein said cylindrical hollow tube is formed of stainless steel.

\* \* \* \* \*